United States Patent [19]

Kneller et al.

[11] 4,287,225

[45] Sep. 1, 1981

[54] PROCESS OF MAKING A MAGNETIC RECORDING MEDIUM

[75] Inventors: Eckhart Kneller, Herbede; Roland Koenig, Ludwigshafen; Eberhard Koester, Frankenthal; Werner Grau, Bobenheim-Roxheim; Dieter Mayer, Ludwigshafen, all of Fed. Rep. of Germany

[73] Assignee: BASF Aktiengesellschaft, Fed. Rep. of Germany

[21] Appl. No.: 126,895

[22] Filed: Mar. 3, 1980

[30] Foreign Application Priority Data

Mar. 14, 1979 [DE] Fed. Rep. of Germany ....... 2909891

[51] Int. Cl.$^3$ .............................................. B05D 3/14
[52] U.S. Cl. ..................................... 427/48; 427/129; 427/132; 427/275; 427/287; 427/294; 427/295
[58] Field of Search ................. 427/48, 129, 132, 275, 427/287, 294, 295

[56] References Cited

U.S. PATENT DOCUMENTS

| | | | |
|---|---|---|---|
| 3,615,911 | 10/1971 | Nesbitt et al. | 148/31.57 |
| 3,970,433 | 7/1976 | Warmka et al. | 29/194 |
| 4,069,360 | 1/1978 | Yanagisawa et al. | 428/64 |
| 4,074,016 | 2/1978 | Trippel | 428/626 |
| 4,152,487 | 5/1979 | Yanagisawa | 428/621 |

FOREIGN PATENT DOCUMENTS 2658956 12/1976 Fed. Rep. of Germany .
1379360 1/1975 United Kingdom .

OTHER PUBLICATIONS

Speliotis, D. E., "Digital Recording Theory", *Advances In Magnetic Recording*, vol. 189, pp. 21–51, (1972).
Judge, J. S., "Thin Films For Magnetic Recording", *Advances In Magnetic Recording*, vol. 189, pp. 117–129, (1972).

*Primary Examiner*—Bernard D. Pianalto
*Attorney, Agent, or Firm*—Keil & Witherspoon

[57] ABSTRACT

A magnetic recording medium comprising a non-magnetic base which is dimensionally stable at up to 300° C., and an 0.03–0.4 μm thick magnetically hard recording layer of an Sm-Co alloy, vacuum-deposited thereon, which layer possesses uniaxial magnetic anisotropy in the plane of the layer, and a process for the manufacture of this recording medium.

6 Claims, No Drawings

PROCESS OF MAKING A MAGNETIC RECORDING MEDIUM

The present invention relates to a magnetic recording medium comprising a non-magnetic base which is dimensionally stable at up to 300° C., and a Sm-Co recording layer vacuum-deposited thereon, and to a process for its manufacture.

It is known that the performance of magnetic recording media, in particular the areal storage density, can be distinctly improved if metallic films are used instead of the conventional recording layers consisting of a magnetic material finely dispersed in a polymeric binder. For example, D. E. Speliotis in "Advances in Magnetic Recording" 189 (1972), 21–51 describes the parameters on which the achievable storage density of a magnetizable layer depends. The coercive force should be very high, the ratio of remanence to saturation magnetization should be almost 1:1, and the layer should be very thin, but is advantageously from 0.05 to 0.4 $\mu$m in order to achieve a sufficiently high signal level. Such magnetic metal layers can be produced in various ways, e.g. by electrodeposition, chemical deposition, vacuum metallizing or sputtering. However, it has hitherto not been possible to manufacture magnetic recording media with magnetic metal films produced in this manner, because of a variety of problems (B. J. Judge "Advances in Magnetic Recording", 189 (1972), 117–129). For example, when the metal coatings are applied by vacuum deposition, the angle of incidence of the evaporated metal flux with respect to the base must be more than 65°, in order to produce magnetic anisotropy in the coating and hence to achieve the requisite high coercive forces. Such a process would, for example, be unsuitable for coating disk-shaped bases having a circular preferred direction of magnetization, as is usually the case with magnetic disks. According to the above publication, the technique of sputtering requires the base to be heated to 500° C. or above. Accordingly, the process is unsuitable for the manufacture of magnetic recording media, since the conventional base materials used for this purpose are unable to withstand such high temperatures. Furthermore, it was found that both chemically deposited and vacuum-deposited magnetic metal layers have poor wear characteristics and insufficient corrosion resistance.

There have therefore been many attempts to overcome the said disadvantages by appropriate processes and apparatus. Thus, both U.S. Pat. No. 3,970,433 and German Laid-Open Application DOS 2,556,755 teach possible ways of reducing corrosion and wear by pretreating the base. However, this requires an elaborate triple-layer arrangement between the base and the magnetic layer, which can easily result in a greater number of errors and irregularities in the recording layer. Furthermore, such recording media cannot be manufactured economically.

Likewise, the processes disclosed in German Laid-Open Applications DOS 2,648,303 and DOS 2,756,254 for providing protective layers on magnetic metal layers are not entirely satisfactory, because of the multi-layer arrangement.

A process for producing magnetic cobalt-iron layers by vacuum deposition is described in German Laid-Open Application DOS 2,250,481. The coercive force of the layers produced by this process however depends greatly on the thickness of the layers and is too low at the layer thicknesses required for such recording media. Furthermore, in the process proposed in the said DOS, vacuum deposition must be carried out at an angle.

With a view to achieving particularly high coercive forces, U.S. Pat. No. 3,615,911 proposes producing Sm-CO$_5$ layers by sputtering. However, this process cannot be employed if the layers are to be used as magnetic recording layers, since the design of the apparatus is very complicated and only allows the production of relatively small samples, the coercive forces of which are furthermore so high that reversal of the magnetization cannot be effected by conventional recording and playback heads.

Similar difficulties arise in the case of metal films consisting of an alloy of iron or cobalt with one of the rare earths, since here anisotropy is at right angles to the recording surface (German Laid-Open Application DOS 2,658,956).

It is an object of the present invention to provide recording media which have a magnetic metal film and which, in respect of their magnetic and mechanical properties, can be fully exploited with existing technology and which can be manufactured by simple conventional methods.

We have found that this object is achieved with a magnetic recording medium comprising a non-magnetic base which is dimensionally stable at up to 300° C., and an 0.05 to 0.4 $\mu$m thick magnetically hard recording layer of an Sm-Co alloy, wherein the recording layer consists of an amorphous Sm-CO$_x$ alloy, where x is from 1 to 20, possesses uniaxial magnetic anisotropy in the plane of the layer and has a coercive force of from 10 to 100 kA/m and a squareness ratio of more than 0.9.

In particular, the invention relates to magnetic recording media wherein the recording layer consists of an amorphous Sm-Co$_x$ alloy, where x is from 5.6 to 16.2.

Such Sm-Co layers can be produced by conventional methods. These include electrodeposition, chemical deposition, vacuum metallizing and sputtering.

In vacuum metallizing and sputtering, the bases are thoroughly cleaned and then introduced into a commercial vacuum-deposition apparatus, which is then brought to a high vacuum ($\leq 10^{-6}$ mm Hg). Whilst the apparatus is being evacuated, the bases may be heated up, for example by means of quartz radiators. To achieve a more uniform layer thickness, the bases may be movably mounted above the evaporating source, for example disk-shaped bases may be caused to rotate during the vacuum-metallizing operation. Furthermore, the bases may be so arranged that after a first layer has been deposited, the bases are turned over and a second layer is deposited on the back of the base, without having to release the vacuum.

The evaporating sources for vacuum metallizing may be resistance-heated, RF-heated or electron beam-heated. To produce evaporated Sm-Co layers, two separate sources may be used, each source evaporating one component of the alloy. By independently regulating the rate of evaporation from the two sources, it is very easy to vary the percentage composition of the evaporated films. When two evaporating sources are employed, care must be taken to ensure that they are arranged close to one another, so that the vapor clouds mix thoroughly and hence layers of a homogeneous composition are obtained. The Sm-Co layers can however also be deposited using a single source if the metal to be evaporated is an Sm-Co alloy. This alloy can, for example, be produced directly in the crucible of an electron beam gun by melting together appropriate amounts of Co and Sm. The different vapor pressures of the materials must be taken into account, and as a result the composition of the alloy evaporated at the source differs from the composition of the alloy in the layer. The difference in composition of the alloys at the source and in the layer can be determined by means of a few experiments.

The Sm-Co layers can be produced at various rates by varying the power supplied to the evaporating source. The deposition rate and the thickness of the layer can be monitored by means of a quartz monitor during the vacuum-metallizing operation, so that it can be terminated when the desired layer thickness is reached.

In the case of sputtering, both DC sputtering and RF sputtering may be employed. Advantageously, however, a magnetron sputtering process is used because the temperature of the base rises to a lesser extent during sputtering. In the case of sputtering, the percentage composition of the Sm-Co layers can be varied by inserting pieces of Sm of different size into a Co target, but it is also possible to use targets of an Sm-Co alloy.

Amorphous Sm-Co layers can thus be produced according to the invention, as is shown by X-ray diffraction investigations. According to these, the crystallite size is less than 2 nm.

Though, in such deposition processes, glass is usually employed as the base, it is advantageous, for the production of, in particular, magnetic recording media, especially magnetic disks, to employ disk-shaped substrates of aluminum or aluminum alloy. These bases can additionally be cleaned by glow discharge or sputter-etching.

In the process according to the invention for the production of an amorphous recording layer from an Sm-Co alloy, the temperature of the base during vacuum deposition (i.e. the manufacturing temperature) should be from 20° to 300° C., preferably from 100° to 250° C. This is because such amorphous layers are metastable, i.e. the structure of the layers can change in the course of time, the change being the more pronounced, the smaller the difference is between the manufacturing temperature and the use temperature. The upper limit of the manufacturing temperature range, according to the invention, is 300° C., since at higher temperatures crystalline layers are produced. Accordingly, within the range of manufacturing temperatures according to the invention, the layers have already been artificially aged without sacrificing their amorphous character. Furthermore, this range of manufacturing temperatures gives the best mechanical properties.

In manufacturing the magnetic recording media according to the invention it has been found that, surprisingly, uniaxial anisotropy can be brought about simply in the amorphous Sm-Co layer, the magnetization of which is in the plane of the layer, if the surface of the base onto which the Sm-Co layer is vacuum-deposited is provided, parallel to the intended easy axis, with groove-shaped depressions having a depth of from 0.03 to 0.4 μm, preferably from 0.1 to 0.2 μm, at a spacing of from 10 to 200 μm. Such depressions can in particular be provided in the conventional disk-shaped aluminum substrates used for the manufacture of magnetic disks, by turning and/or concentric grinding and polishing, since the substrates are in any case subjected to these mechanical processes in the course of their manufacture. In the case of bases finished in this way, the groove-shaped depressions are thus arranged concentrically. Consequently, a concentric uniaxial anisotropy corresponding to the conventional arrangement of the recording tracks on magnetic disks can be produced without additional expense. Using this process according to the invention, vacuum deposition at an angle, which is conventionally used to produce evaporated magnetic layers having uniaxial anisotropy, and which suffers from the disadvantage that there are great variations in the thickness of the layer, is avoided.

The magnetic recording media according to the invention, possessing amorphous Sm-Co layers, can also be produced by conventional vacuum deposition of magnetic metal films in a substantially uniform magnetic field of more than 5 kA/m. This process may be used advantageously for the manufacture of magnetic recording media for longitudinal recording and having plastic base materials.

In producing the Sm-Co layers according to the invention, the vacuum deposition of the Sm-Co alloy can be followed by applying a cobalt oxide top layer, from 5 to 50 nm thick, by subsequent evaporation of cobalt alone under an oxygen partial pressure of from $10^{-3}$ to $10^{-5}$ mm Hg. However, the provision of such a top layer is only advisable if the magnetic layer is exposed to extremely severe mechanical or corrosive conditions.

The magnetic recording media according to the invention have in particular a higher coercive force and a higher squareness ratio, i.e. a higher ratio of remanence to saturation magnetization, than conventional recording media possessing a magnetizable metal film. However, other properties, such as adhesion, wear resistance and corrosion resistance, of the layer are substantially improved. In view of the embodiment of the manufacturing process according to the invention which produces uniaxial anisotropy in the plane of the magnetic metal film, these advantages can be utilized particularly for the manufacture of high-quality magnetic disks. Compared to conventional magnetic disks which possess a layer of a magnetic material finely dispersed in an organic binder, the novel disks possess comparable adhesion of the layer, and distinctly superior wear resistance.

The Examples which follow illustrate the invention.

EXAMPLE 1

Samarium and cobalt are simultaneously deposited by means of two separate electron beam guns on a microscope slide in a commercial vacuum-metallizing apparatus. The rate of deposition is 2 nm per second under a pressure of $10^{-6}$ mm Hg. When the thickness of the layer has reached 0.1 μm, vacuum deposition is terminated. The resulting layer consists of an Sm-Co$_{11.7}$ alloy, as determined by X-ray fluorescence. Investigation by X-ray diffraction indicates an amorphous structure, i.e. the crystallite size is less than 2 nm. The magnetic properties are determined by means of a vibrating sample magnetometer at a field strength of 120 kA/m. According to this determination, the magnetization is isotropic and in the plane of the layer. The coercive force $H_c$ is 42 kA/m.

EXAMPLE 2

0.18 μm thick Sm-Co$_{3.1}$ layers are produced on 47×50 mm glass plates (Code 7059 from Corning Glass) by evaporating an Sm-Co$_{50}$ alloy from an electron beam gun with a crucible capacity of 40 cm³, in a commercial vacuum-metallizing apparatus operated at a pressure of $10^{-6}$ mm Hg. By means of the quartz radiator installed in the apparatus, it is possible to raise the temperature of the substrates so that deposition can be carried out at from 50° to 150° C. The magnetic properties measured on the layers thus produced are shown in Table 1.

The squareness ratio is determined by measuring $M_r$ (the remanence) and $M_s$ (the saturation magnetization) by means of a vibrating sample magnetometer. As is usual, $M_s$ is taken to be the value of the magnetization at $H_s$, where $H_s$ corresponds to the field strength at which the hysteresis curves touch upon reversal of the field.

COMPARATIVE EXPERIMENT 1

An 0.18 μm thick cobalt layer is vacuum-deposited on a glass plate, heated to 150° C., in an apparatus as described in Example 2, and under the same conditions as described there. The magnetic properties of the cobalt layer are shown in Table 1.

TABLE 1

|  | Substrate temperature | $M_r/M_s$ | $H_c$ [kA/m] |
| --- | --- | --- | --- |
| Example 2 (a) | room temperature | 0.95 | 34 |
| Example 2 (b) | 50° C. | 0.97 | 31 |
| Example 2 (c) | 150° C. | 1.0 | 58 |
| Comparative Experiment 1 | 150° C. | 0.7 | 9 |

EXAMPLE 3

Concentric groove-shaped depressions 0.2 μm deep and spaced 50 μm apart are produced by means of a precision lathe in the surface of a disk-shaped base consisting of an AlMg$_5$ alloy. An 0.17 μm thick Sm-Co$_{3.1}$ layer is deposited thereon by means of a conventional vacuum-metallizing apparatus, operated under a pressure of $10^{-6}$ mm Hg. The magnetic properties of this layer are determined by means of a Kerr magnetometer. On rotating the disk-shaped sample it is found that the preferred direction of magnetization runs parallel to the concentric grooves. The coercive force is 47 kA/m and the squareness ratio is 0.95.

EXAMPLE 4

The procedure followed is as described in Example 2, an Sm-Co$_{7.1}$ layer 0.18 μm thick being applied to aluminum disks (AlMg$_5$ alloy) at room temperature, 100° C. and 250° C. respectively. The adhesion of the magnetic layer to the base is determined on these samples, by the DIN 43,232 tear-off method. In addition, the wear resistance of the layers is tested by means of an abrader manufactured by Erichsen, 5870 Hemer Sundwig/-Westf., Germany (Model No. 317), and recorded in nm of abrasion per stroke. The results of these measurements are shown in Table 2.

COMPARATIVE EXPERIMENT 2

The adhesion of the layer to the base, and the wear resistance of the layer, are determined by the methods of Example 4 on a commercial magnetic disk carrying a layer of a magnetic material finely dispersed in an organic binder. The results are shown in Table 2.

TABLE 2

|  | Substrate temperature | Adhesion [N/mm$^2$] | Wear resistance [nm/stroke] |
| --- | --- | --- | --- |
| Example 4 (a) | room temperature | 1.2 | 0.26 |
| Example 4 (b) | 100° C. | 2.0 | 0.13 |
| Example 4 (c) | 250° C. | 12.9 | 0.13 |
| Comparative Experiment 2 | — | 10 | 0.60 |

EXAMPLE 5

An 0.18 μm thick Sm-Co$_{7.1}$ layer is vacuum-deposited on a glass plate by the method described in Example 2. This constitutes sample A. The experiment is repeated, but subsequently an oxygen partial pressure of $5.10^{-4}$ mm Hg is set up in the vacuum-metallizing apparatus by introducing oxygen, and only cobalt is evaporated. As a result, a bluish top layer of cobalt oxide, 50 nm thick, forms on the Sm-Co layer. This constitutes sample B. Both samples are then exposed for 24 hours to an atmosphere saturated with water vapor, at 40° C. After this exposure, no change in the layer is found on either sample. The wear resistance of sample B increased to less than 0.10 nm/stroke due to the cobalt oxide top layer.

EXAMPLE 6

An electromagnet is fitted externally around the bell jar of the apparatus described in Example 2. The bell jar consists of non-magnetic steel. A uniform magnetic field of 6 kA/m is produced in the vacuum by means of this electromagnet, with the field lines running parallel to the plane of the base. Sm-Co$_{3.1}$ layers are deposited on glass plates by the method described in Example 2. The direction of the uniaxial anisotropy is determined by means of the Kerr magnetometer. It is found that the easy axis runs parallel to the magnetic field lines during vacuum deposition.

EXAMPLE 7

The procedure described in Example 6 is followed, except that the glass plates are caused to rotate at 20 rpm, by means of an electric motor installed in the vacuum-metallizing apparatus, during deposition. In addition, the glass plates are not coated simultaneously over their entire surface, but instead most of their surface is covered by a fixed metal sheet, having small openings in the form of 20° sectors. The openings are so arranged that the apex coincides with the center of rotation of the substrates and the longitudinal axis of the openings is at right angles to the field lines of the electromagnet. The resulting Sm-Co$_{3.1}$ layers are examined for uniformity of thickness by measuring the light transmission, and for the position of the easy axis by measurement with a Kerr magnetometer. It is found that as a result of the magnetic field and of the rotary motion of the substrates behind the shutter during vacuum deposition, uniformly thick Sm-Co layers with a concentric preferred direction of magnetization are obtained.

We claim:

1. A process for the manufacture of a magnetic recording medium by vacuum-depositing a recording layer of an Sm-Co alloy onto a non-magnetic base which is dimensionally stable at up to 300° C., wherein the recording layer consists of an amorphous Sm-Co$_x$ alloy, where x is from 1 to 20, possesses uniaxial magnetic anisotropy in the plane of the layer and has a coercive force of from 10 to 100 kA/m and a squareness ratio of more than 0.9, and the surface of the base is provided, parallel to the intended uniaxial anisotropy, with groove-shaped depressions having a depth of from 0.03 to 0.4 μm, at a spacing of from 10 to 200 μm.

2. A process for the manufacture of a magnetic recording medium as claimed in claim 1, wherein the groove-shaped depressions are arranged concentrically to one another.

3. A process for the manufacture of a magnetic recording medium as claimed in claim 2, wherein the base is kept at from 20° to 300° C. during vacuum deposition.

4. A process for the manufacture of a magnetic recording medium as claimed in claim 1, wherein, during vacuum deposition, the base is in a substantially uniform magnetic field of more than 5 kA/m, applied parallel to the intended uniaxial anisotropy.

5. A process for the manufacture of a magnetic recording medium as claimed in claim 4, wherein the base is kept at from 20° to 300° C. during vacuum deposition.

6. A process for the manufacture of a magnetic recording medium as claimed in claim 1, wherein the base is kept at from 20° to 300° C. during vacuum deposition.

* * * * *